United States Patent [19]
Edelen et al.

[11] Patent Number: 5,281,902
[45] Date of Patent: Jan. 25, 1994

[54] VOLTAGE COMPENSATION OF A PULSE-WIDTH-MODULATED SERVOMECHANISM

[75] Inventors: Stephen A. Edelen, Battle Creek, Mich.; Chiau-Chieh Ong, Kokomo, Ind.

[73] Assignee: Eaton Corporation, Cleveland, Ohio

[21] Appl. No.: 925,046

[22] Filed: Aug. 5, 1992

[51] Int. Cl.$^5$ .................. G01R 17/02; B60K 41/18
[52] U.S. Cl. ............................. 318/632; 318/139; 318/254; 364/424.1; 364/424.05; 74/335; 74/866
[58] Field of Search ............... 318/560–646, 318/139; 74/335, 365, 886, 336 R; 364/424.1, 424.2, 424.6, 150–169

[56] References Cited

U.S. PATENT DOCUMENTS

| | | | |
|---|---|---|---|
| 4,384,321 | 5/1983 | Rippel | 363/124 |
| 4,490,666 | 12/1984 | Tanamachi et al. | 318/800 |
| 4,642,538 | 2/1987 | Elliott et al. | 318/139 |
| 4,757,241 | 7/1988 | Young | 318/254 |
| 4,943,758 | 7/1990 | Tsurumiya | 318/504 |
| 4,967,385 | 10/1990 | Brekkestran et al. | 364/424.1 X |
| 4,977,507 | 12/1990 | Matsuoka et al. | 364/424.05 |
| 4,998,444 | 3/1991 | Mabee | 74/335 |
| 5,043,892 | 8/1991 | Brekkestran et al. | 364/424.1 |
| 5,053,960 | 10/1991 | Brekkestran et al. | 364/424.1 |
| 5,079,437 | 1/1992 | Monroe | 307/38 |
| 5,081,365 | 1/1992 | Field et al. | 290/45 |

Primary Examiner—Paul Ip
Attorney, Agent, or Firm—C. H. Grace

[57] ABSTRACT

A position-feedback-control servomechanism for shifting the transmission of a vehicle has both an adaptive proportional-integral-differential controller to compensate for manufacturing variations, etc, and a voltage-compensation system that senses the battery voltage and prevents the gain of a servomechanism drive motor from varying significantly when the battery voltage changes. The motor is preferably a permanent-magnet type to whose terminals the battery voltage is switched on and off. The switching is done by electronic switches that are under the control of a pulse-width-modulated signal. The width of the pulses of the pulse-width-modulated signal is controlled by both a closed-loop position-error signal and a signal derived from an open-loop measurement of the battery voltage.

3 Claims, 12 Drawing Sheets

| 12/R | R/12 | 12/34 | 34/56 | 56/34 | 34/12 |
| --- | --- | --- | --- | --- | --- |
| 14(9) | 14(7) | 13(9) | 15(11) | 14(9) | 12(9) |
| 13(9) | 16(7) | 13(9) | 15(11) | 14(9) | 13(9) |
| 14(9) | 16(7) | 13(9) | 15(11) | 14(9) | 13(9) |
| 13(9) | 16(7) | 13(9) | 15(11) | 14(9) | 12(9) |
| 14(9) | 14(7) | 13(9) | 15(11) | 14(9) | 15(9) |
| 14(9) | 14(7) | 12(9) | 15(11) | 14(9) | 15(9) |
| 14(9) | 16(7) | 13(9) | 15(11) | 15(9) | 12(9) |
| 14(9) | 13(7) | 13(9) | 15(11) | 14(9) | 13(9) |
| 14(9) | 15(7) | 12(9) | 15(11) | 14(9) | 13(9) |
| 14(9) | 14(7) | 13(9) | 15(11) | 14(9) | 13(9) |
| 14(9) | 14(7) | 13(9) | 15(11) | 14(9) | 12(9) |
| 14(9) | 16(7) | 13(9) | 15(11) | 14(9) | 13(9) |
| 14(9) | 16(7) | 12(9) | 15(11) | 14(9) | 13(9) |
| 13(9) | 16(7) | 13(9) | 15(11) | 14(9) | 12(9) |
| 14(9) | 13(7) | 13(9) | 15(11) | 14(9) | 13(9) |
| 14(9) | 14(7) | 12(9) | 15(11) | 14(9) | 12(9) |
| 13(9) | 14(7) | 13(9) | 15(11) | 14(9) | 13(9) |
| 14(9) | 15(7) | 13(9) | 15(11) | 14(9) | 15(9) |
| 14(9) | 14(7) | 15(9) | 15(11) | 14(9) | 13(9) |
| 13(9) | 16(7) | 13(9) | 15(11) | 14(9) | 13(9) |
| 14(9) | 15(7) | 13(9) | 15(11) | 14(9) | 12(9) |
| 14(9) | 14(7) | 13(9) | 15(11) | 14(9) | 15(9) |
| 13(9) | 16(7) | 12(9) | 15(11) | 15(9) | 13(9) |
| 14(9) | 14(7) | 13(9) | 15(11) | 14(9) | 13(9) |
| 14(9) | 14(7) | | | | |

| | 12/R | R/12 | 12/34 | 34/56 | 56/34 | 34/12 | |
| --- | --- | --- | --- | --- | --- | --- | --- |
| A.V. | 13.76 | 14.76 | 12.87 | 15.00 | 14.08 | 13.04 | 13. |
| S.D. | 0.44 | 1.05 | 0.61 | 0.00 | 0.28 | 1.00 | 1.6 |

FIG. 6

| 12/R | R/12 | 12/34 | 34/56 | 56/34 | 34/12 | |
|---|---|---|---|---|---|---|
| 13(9) | 12(9) | 14(9) | 15(11) | 13(9) | 13(10) | |
| 13(9) | 12(9) | 14(9) | 15(11) | 14(9) | 13(10) | |
| 14(9) | 12(9) | 14(9) | 15(11) | 12(9) | 13(10) | |
| 13(9) | 13(9) | 12(9) | 15(11) | 12(9) | 13(10) | |
| 13(9) | 13(9) | 12(9) | 15(11) | 12(9) | 13(10) | |
| 15(9) | 12(9) | 12(9) | 15(11) | 14(9) | 11(10) | |
| 14(9) | 15(9) | 14(9) | 15(11) | 12(9) | 11(10) | |
| 14(9) | 14(9) | 14(9) | 15(11) | 12(9) | 14(10) | |
| 13(9) | 13(9) | 14(9) | 13(11) | 14(9) | 13(10) | |
| 14(9) | 14(9) | 14(9) | 13(11) | 14(9) | 13(10) | |
| 13(9) | 12(9) | 14(9) | 13(11) | 14(9) | 13(10) | |
| 14(9) | 14(9) | 14(9) | 13(11) | 14(9) | 13(10) | |
| 13(9) | 13(9) | 12(9) | 15(11) | 12(9) | 13(10) | |
| 14(9) | 14(9) | 14(9) | 15(11) | 12(9) | 13(10) | |
| 15(9) | 12(9) | 14(9) | 13(11) | 14(9) | 11(10) | |
| 13(9) | 14(9) | 14(9) | 13(11) | 14(9) | 11(10) | |
| 15(9) | 14(9) | 14(9) | 15(11) | 14(9) | 13(10) | |
| 14(9) | 13(9) | 12(9) | 14(11) | 12(9) | 13(10) | |
| 14(9) | 13(9) | 12(9) | 15(11) | 12(9) | 14(10) | |
| 13(9) | 14(9) | 14(9) | 15(11) | 12(9) | 13(10) | |
| 15(9) | 12(9) | 14(9) | 15(11) | 12(9) | 13(10) | |
| 15(9) | 12(9) | 14(9) | 15(11) | 12(9) | 13(10) | |
| 15(9) | 12(9) | 14(9) | 15(11) | 12(9) | 13(10) | |
| 14(9) | 14(9) | 12(9) | 15(11) | 14(9) | 11(10) | |
| 13(9) | 12(9) | 14(9) | 13(11) | 14(9) | 13(10) | |

| | 12/R | R/12 | 12/34 | 34/56 | 56/34 | 34/12 | |
|---|---|---|---|---|---|---|---|
| A.V. | 13.84 | 13.00 | 13.44 | 14.40 | 12.92 | 12.68 | 13.3 |
| S.D. | 0.80 | 0.96 | 0.92 | 0.91 | 1.00 | 0.90 | 2.24 |

FIG. 7

| 12/R | R/12 | 12/34 | 34/56 | 56/34 | 34/12 | |
|---|---|---|---|---|---|---|
| 12(9) | 11(9) | 11(9) | 13(9) | 11(9) | 10(9) | |
| 11(9) | 11(9) | 10(9) | 13(9) | 12(9) | 10(9) | |
| 11(9) | 11(9) | 10(9) | 13(9) | 12(9) | 11(9) | |
| 11(9) | 11(9) | 10(9) | 13(9) | 12(9) | 10(9) | |
| 11(9) | 11(9) | 10(9) | 13(9) | 12(9) | 11(9) | |
| 11(9) | 11(9) | 10(9) | 12(9) | 12(9) | 10(9) | |
| 11(9) | 11(9) | 10(9) | 12(9) | 12(9) | 11(9) | |
| 11(9) | 11(9) | 11(9) | 13(9) | 12(9) | 10(9) | |
| 11(9) | 11(9) | 10(9) | 13(9) | 12(9) | 11(9) | |
| 11(9) | 11(9) | 10(9) | 12(9) | 11(9) | 10(9) | |
| 11(9) | 11(9) | 10(9) | 13(9) | 12(9) | 11(9) | |
| 11(9) | 11(9) | 10(9) | 13(9) | 12(9) | 10(9) | |
| 11(9) | 11(9) | 10(9) | 13(9) | 12(9) | 11(9) | |
| 11(9) | 11(9) | 10(9) | 13(9) | 12(9) | 10(9) | |
| 11(9) | 11(9) | 10(9) | 13(9) | 12(9) | 11(9) | |
| 11(9) | 11(9) | 10(9) | 13(9) | 12(9) | 10(9) | |
| 11(9) | 11(9) | 10(9) | 13(9) | 11(9) | 10(9) | |
| 11(9) | 11(9) | 10(9) | 13(9) | 12(9) | 10(9) | |
| 11(9) | 11(9) | 10(9) | 13(9) | 11(9) | 11(9) | |
| 11(9) | 11(9) | 10(9) | 12(9) | 12(9) | 11(9) | |
| 11(9) | 11(9) | 10(9) | 12(9) | 12(9) | 11(9) | |
| 11(9) | 11(9) | 10(9) | 12(9) | 12(9) | 10(9) | |
| 11(9) | 11(9) | 10(9) | 12(9) | 12(9) | 10(9) | |
| 11(9) | 11(9) | 11(9) | 12(9) | 11(9) | 10(9) | |
| 11(9) | 11(9) | 10(9) | 12(9) | 11(9) | 11(9) | |
| 11(9) | 11(9) | 10(9) | 12(9) | 11(9) | 10(9) | |
| 11(9) | 11(9) | | | | | |

| | 12/R | R/12 | 12/34 | 34/56 | 56/34 | 34/12 | |
|---|---|---|---|---|---|---|---|
| A.V. | 11.04 | 11.00 | 10.12 | 12.62 | 11.73 | 10.42 | 11.15 |
| S.D. | 0.19 | 0.00 | 0.33 | 0.50 | 0.45 | 0.50 | 0.92 |

FIG. 8

| 12/R | R/12 | 12/34 | 34/56 | 56/34 | 34/12 | |
|---|---|---|---|---|---|---|
| 13(9) | 11(9) | 11(9) | 13(9) | 11(9) | 10(9) | |
| 12(9) | 11(9) | 11(9) | 13(10) | 12(9) | 10(9) | |
| 12(9) | 11(9) | 11(9) | 13(10) | 12(9) | 14(9) | |
| 12(9) | 11(9) | 11(9) | 13(10) | 12(9) | 10(10) | |
| 12(9) | 11(9) | 11(9) | 12(10) | 11(9) | 12(10) | |
| 12(9) | 11(9) | 11(9) | 13(9) | 11(9) | 11(11) | |
| 12(9) | 11(9) | 11(9) | 13(10) | 12(9) | 12(11) | |
| 12(9) | 11(9) | 11(9) | 13(10) | 12(9) | 10(12) | |
| 12(9) | 11(9) | 11(9) | 13(10) | 12(9) | 10(12) | |
| 12(9) | 11(9) | 11(9) | 13(10) | 12(9) | 10(12) | |
| 12(9) | 11(9) | 10(9) | 13(10) | 12(9) | 10(12) | |
| 12(9) | 11(9) | 11(9) | 13(10) | 12(9) | 10(12) | |
| 12(9) | 11(9) | 11(9) | 13(10) | 12(9) | 10(12) | |
| 12(9) | 11(9) | 11(9) | 13(10) | 12(9) | 10(12) | |
| 12(9) | 11(9) | 11(9) | 13(10) | 12(9) | 10(12) | |
| 12(9) | 11(9) | 10(9) | 13(10) | 12(9) | 11(12) | |
| 12(9) | 11(9) | 11(9) | 13(10) | 12(9) | 10(12) | |
| 12(9) | 11(9) | 11(9) | 13(10) | 12(9) | 12(12) | |
| 12(9) | 11(9) | 11(9) | 13(10) | 12(9) | 10(10) | |
| 12(9) | 11(9) | 11(9) | 13(10) | 12(9) | 10(10) | |
| 12(9) | 11(9) | 11(9) | 13(10) | 12(9) | 10(10) | |
| 12(9) | 11(9) | 11(9) | 13(10) | 12(9) | 10(10) | |
| 12(9) | 11(9) | 11(9) | 13(10) | 12(9) | 10(10) | |
| 12(9) | 11(9) | 11(9) | 12(10) | 11(9) | 10(10) | |
| 12(9) | 11(9) | 11(9) | 12(10) | 11(9) | 10(10) | |
| 12(9) | 11(9) | 11(9) | 13(10) | 12(9) | 10(10) | |
| 12(9) | 11(9) | 11(9) | 13(10) | 12(9) | 10(10) | |
| 12(9) | 11(9) | 11(9) | 13(10) | 12(9) | 10(10) | |
| 11(9) | 11(9) | 11(9) | 13(10) | 12(9) | 10(10) | |
| 12(9) | 11(9) | 11(9) | 13(10) | | | |
| A.V. 11.67 | 11.00 | 10.93 | 12.90 | 11.83 | 10.41 | 11.46 |
| S.D. 1.65 | 0.00 | 0.25 | 0.31 | 0.38 | 0.95 | 1.98 |

FIG. 9

| 12/R | R/12 | 12/34 | 34/56 | 56/34 | 34/12 | |
|---|---|---|---|---|---|---|
| 11(9) | 11(7) | 10(9) | 11(11) | 15(9) | 12(9) | |
| 10(9) | 11(7) | 10(9) | 11(11) | 15(9) | 12(9) | |
| 10(9) | 11(7) | 12(9) | 12(11) | 15(9) | 12(9) | |
| 10(9) | 11(7) | 12(9) | 11(11) | 15(9) | 12(9) | |
| 10(9) | 11(7) | 12(9) | 11(11) | 15(9) | 12(9) | |
| 10(9) | 11(7) | 12(9) | 11(11) | 15(9) | 12(9) | |
| 10(9) | 11(7) | 10(9) | 11(11) | 15(9) | 12(9) | |
| 11(9) | 11(7) | 12(9) | 11(11) | 15(9) | 12(9) | |
| 11(9) | 11(7) | 12(9) | 12(11) | 15(9) | 12(9) | |
| 10(9) | 11(7) | 12(9) | 11(11) | 15(9) | 12(9) | |
| 10(9) | 11(7) | 12(9) | 11(11) | 15(9) | 12(9) | |
| 10(9) | 11(7) | 12(9) | 11(11) | 15(9) | 12(9) | |
| 10(9) | 11(7) | 10(9) | 11(11) | 15(9) | 12(9) | |
| 10(9) | 11(7) | 12(9) | 11(11) | 15(9) | 10(9) | |
| 11(9) | 11(7) | 10(9) | 11(11) | 15(9) | 12(9) | |
| 10(9) | 11(7) | 10(9) | 11(11) | 15(9) | 12(9) | |
| 10(9) | 11(7) | 12(9) | 11(11) | 15(9) | 12(9) | |
| 10(9) | 11(7) | 12(9) | 11(11) | 15(9) | 12(9) | |
| 10(9) | 11(7) | 10(9) | 11(11) | 15(9) | 12(9) | |
| 10(9) | 11(7) | 10(9) | 11(11) | 15(9) | 12(9) | |
| 10(9) | 11(7) | 10(9) | 11(11) | 15(9) | 12(9) | |
| 10(9) | 11(7) | 10(9) | 11(11) | 15(9) | 12(9) | |
| 10(9) | 11(7) | 10(9) | 11(11) | 15(9) | 12(9) | |
| 11(9) | 11(7) | 12(9) | 11(11) | 15(9) | 12(9) | |
| 10(9) | 11(7) | 12(9) | 11(11) | 15(9) | 12(9) | |
| 10(9) | 11(7) | 10(9) | 11(11) | 15(9) | 12(9) | |
| 10(9) | 11(7) | 10(9) | 11(11) | 15(9) | | |
| A.Y. | 10.19 | 11.00 | 11.04 | 11.07 | 15.00 | 11.92 | 11.70 |
| S.D. | 0.40 | 0.00 | 1.02 | 0.27 | 0.00 | 0.39 | 1.19 |

FIG. 10

| 12/R | R/12 | 12/34 | 34/56 | 56/34 | 34/12 | |
|---|---|---|---|---|---|---|
| 12(9) | 12(9) | 12(9) | 14(11) | 13(9) | 12(10) | |
| 13(9) | 12(9) | 12(9) | 14(11) | 13(9) | 11(10) | |
| 13(9) | 12(9) | 12(9) | 14(11) | 13(9) | 12(10) | |
| 12(9) | 12(9) | 12(9) | 13(11) | 13(9) | 12(10) | |
| 13(9) | 12(9) | 11(9) | 14(11) | 13(9) | 12(10) | |
| 13(9) | 12(9) | 12(9) | 14(11) | 13(9) | 12(10) | |
| 13(9) | 12(9) | 12(9) | 14(11) | 13(9) | 12(10) | |
| 13(9) | 12(9) | 12(9) | 14(11) | 13(9) | 11(10) | |
| 13(9) | 12(9) | 12(9) | 14(11) | 13(9) | 12(10) | |
| 13(9) | 12(9) | 12(9) | 14(11) | 13(9) | 12(10) | |
| 13(9) | 12(9) | 12(9) | 14(11) | 13(9) | 12(10) | |
| 13(9) | 12(9) | 12(9) | 14(11) | 14(9) | 12(10) | |
| 13(9) | 12(9) | 12(9) | 14(11) | 13(9) | 12(10) | |
| 12(9) | 12(9) | 12(9) | 13(11) | 13(9) | 12(10) | |
| 13(9) | 12(9) | 12(9) | 14(11) | 13(9) | 12(10) | |
| 13(9) | 12(9) | 12(9) | 14(11) | 13(9) | 12(10) | |
| 13(9) | 12(9) | 12(9) | 14(11) | 13(9) | 12(10) | |
| 13(9) | 12(9) | 12(9) | 13(11) | 13(9) | 12(10) | |
| 13(9) | 12(9) | 12(9) | 13(11) | 13(9) | 12(10) | |
| 13(9) | 12(9) | 12(9) | 14(11) | 13(9) | 12(10) | |
| 13(9) | 12(9) | 11(9) | 14(11) | 13(9) | 12(10) | |
| 13(9) | 12(9) | 12(11) | 14(11) | 13(9) | 12(10) | |
| 13(9) | 12(9) | 12(9) | 14(11) | 13(9) | 12(10) | |
| 13(9) | 12(9) | 12(9) | 14(11) | 13(9) | 13(10) | |
| 13(9) | 12(9) | 12(9) | 14(11) | 13(9) | 12(10) | |
| 13(9) | 12(9) | 12(9) | 14(11) | 13(9) | 12(10) | |
| 13(9) | 12(9) | 12(9) | 14(11) | 13(9) | | |
| A.V. 12.88 | 12.00 | 11.92 | 13.85 | 13.04 | 11.96 | 12.61 |
| S.D. 0.33 | 0.00 | 0.27 | 0.37 | 0.20 | 0.35 | 0.69 |

FIG.11

Ho: VOLTAGE COMPENSATION DOES NOT EFFECT CONSISTENCY
Ha: VOLTAGE COMPENSATION IMPROVES CONSISTENCY $$* \text{F-TEST} = \frac{n_x S_{xVOLT}^2 (n_y - 1)}{n_y S_{yVOLT}^2 (y^2 - 1)} \quad 3.49$$

$n_x = 7$
$n_y = 7$
$S_{xVOLT} = 1.00$
$S_{yVOLT} = 0.54$

* ASSUMES MEANS ARE ABOUT THE SAME
P-VALUE   F6,6,.95,; F6,6,.95 - 3.05

CONCLUSION: ACCEPT Ha: VOLTAGE COMPENSATION IMPROVES CONSISTENCY CONFIDENCE IS BETWEEN THE 90% AND 95% LEVEL.

POPULATION "ONE" WITHOUT VOLTAGE COMPENSATION
EACH ENTRY REPRESENTS AN AVERAGE OF ABOUT 25 SHIFTS

| VDC | P-1/2 | 1/2-3/4 | 5/16-3/4 | 3/4-1/2 | $\bar{X}_{VOLT}$, J | $S_{xVOLT}$, J | n |
|---|---|---|---|---|---|---|---|
| 10 | 14.76 | 12.87 | 14.08 | 13.04 | 13.7 | 0.773 | 1 |
| 11 | 12.92 | 12.38 | 14.04 | 12.04 | 12.8 | 0.758 | 2 |
| 12 | 11.00 | 10.12 | 11.73 | 10.42 | 10.8 | 0.615 | 3 |
| 13 | 12.00 | 11.15 | 13.18 | 11.69 | 12.0 | 0.732 | 4 |
| 14 | 11.00 | 11.00 | 11.86 | 11.00 | 11.2 | 0.416 | 5 |
| 15 | 11.22 | 10.93 | 11.00 | 10.00 | 10.8 | 0.467 | 6 |
| 16 | 11.00 | 11.04 | 15.00 | 11.92 | 12.2 | 1.635 | 7 |
|  | X1 | X2 | X3 | X4 | $\bar{\bar{X}}$ = | 11.95 |  |
| $\bar{X}i$ = | 11.99 | 11.38 | 12.99 | 11.44 | $\bar{\bar{X}}$ = | $S_{xVOLTS}$ 1.00 | **** |
| $S_{xsf,i}$ = | 1.31 | 0.87 | 1.36 | 0.97 |  | 11.95 |  |
|  |  |  |  |  |  | $S_{xSHIFT}$ = 0.21 |  |

STANDARD DEVIATION IF VOLTS AND SHIFT TYPE ARE INDEPENDENT  1.03
MAXIMUM SHIFT TIME IF THE POPULATION IS NORMAL (3 SIGMA)  15.0 ****

POPULATION "TWO", WITH VOLTAGE COMPENSATION
EACH ENTRY REPRESENTS AN AVERAGE OF ABOUT 25 SHIFTS

| VDC | P-1/2 | 1/2-3/4 | 5/16-3/4 | 3/4-1/2 | $\bar{Y}_{VOLT}$, J | $S_{yVOLT}$, J | n |
|---|---|---|---|---|---|---|---|
| 10 | 13.00 | 13.44 | 12.92 | 12.68 | 13.0 | 0.27 | 1 |
| 11 | 12.31 | 12.31 | 12.50 | 11.27 | 12.1 | 0.48 | 2 |
| 12 | 11.00 | 10.93 | 11.83 | 10.41 | 11.0 | 0.51 | 3 |
| 13 | 12.04 | 12.00 | 13.00 | 11.36 | 12.1 | 0.59 | 4 |
| 14 | 12.50 | 12.00 | 13.04 | 11.44 | 12.2 | 0.59 | 5 |
| 15 | 12.04 | 12.00 | 13.00 | 12.28 | 12.3 | 0.40 | 6 |
| 16 | 12.00 | 11.92 | 13.04 | 11.96 | 12.2 | 0.47 | 7 |
|  | $\bar{Y}1$ | $\bar{Y}2$ | $\bar{Y}3$ | $\bar{Y}4$ | $\bar{\bar{Y}}$ = | 12.15 |  |
| $\bar{Y}i$ = | 12.13 | 12.09 | 12.76 | 11.63 | $\bar{\bar{Y}}$ = | $S_{yVOLTS}$ = 0.54 | **** |
| $S_{ysft,i}$ = | 0.57 | 0.68 | 0.42 | 0.69 |  | 12.15 |  |
|  |  |  |  |  |  | $S_{ySHIFT}$ = 0.11 |  |

STANDARD DEVIATION IF VOLTS AND SHIFT TYPE ARE INDEPENDENT  0.55
MAXIMUM SHIFT TIME IF THE POPULATION IS NORMAL (3 SIGMA)  13.8

FIG. 12

VOLTAGE COMPENSATION OF A PULSE-WIDTH-MODULATED SERVOMECHANISM

FIELD OF THE INVENTION

The invention relates to closed-loop control systems for controlling actuators, such as a control system for shifting the transmission of a vehicle.

SUMMARY OF THE INVENTION

The Problem

Control circuits have been used in prior art to drive actuators, for example, as in the preferred embodiment of the invention described herein, to drive a transmission-shifting servomechanism to its various positions. However, in the prior transmission-shifting mechanisms, the shifting performance was not always optimum because the gain of the control loop varied in accordance with the voltage of the vehicle's battery, which was used to drive an electric motor to move the shift mechanism. For example, gain constants of the control circuit that were chosen for good performance when the battery voltage was 12 volts were not appropriate when the battery voltage was some other value such as 14 volts. Different battery voltages caused different gains of the electric motor.

The Approach of This Invention

The present invention provides a servomechanism whose performance is substantially independent of the voltage of the battery. In a preferred embodiment of the invention the power of a motor is controlled by applying a pulse-width-modulated (PWM) switching signal that periodically connects and disconnects the motor to the battery for short time intervals, as in prior art. However, the widths of the PWM pulses, which are controlled in part by an error signal that is the difference between a position-feedback signal and position commands, are also controlled in this invention as a function of the battery voltage, in such a way as to compensate the performance for variations in battery voltage.

The energy of the pulses of the PWM signal is a function of a closed-loop error signal and an open-loop battery-voltage-compensation signal. In the particular preferred embodiment of the invention described below, the frequency of energy pulses to the motor is constant irrespective of both the battery voltage and the closed-loop error signal of the servomechanism, but constancy of frequency is not essential. The duration of the pulses is varied.

Voltage regulation alone by pulse-width modulation is not new; in the present invention the error signal of the servomechanism is multiplied by the battery-compensation signal to control the width of pulse-width-modulated motor-actuating signals applied to the motor.

In the case of the preferred embodiment, the motor is a permanent-magnet type, so its output power, if uncompensated, would be a function approximately of the square of the battery voltage, and of the duration of pulses of the PWM switching signal. To compensate for the fact that the power of the motor would be undesirably responsive to the square of the battery voltage, the duration of the pulses is made responsive herein to a function that involves the square of the battery voltage, thereby to compensate the power gain of the motor for variations in battery voltage. Time averaging of PWM input energy is performed in the motor because of the high inertia of the motor relative to the period of the energy pulses of the PWM signal that switches the motor's input power on and off.

The preferred embodiment is an adaptive servomechanism. An adaptive servomechanism may make corrections in its parameters (e.g., its proportional-channel gain and its differential-channel gain), at relatively infrequent times to compensate for changes of performance due to changes of temperature, etc. In the preferred embodiment corrections are made following each measurement of performance of the shift mechanism, each performance being in response to a shift command. However, the battery voltage can change after one adaptive correction of the servosystem parameters is made, and before the next shift, hence before the next performance measurement and correction. Without the present invention, the loop gains of the system would then be incorrect at the time of the next shift, because the gain of the motor would have changed subsequent to the most recent adaptive adjustment of the control parameters. The parameter-adaptiveness capability therefore renders even more valuable the inventive combination of error signal and battery-voltage-compensation signal for controlling pulse width.

The additional advantage of the invention when the servomechanism is an adaptive type can be stated in another way as follows. Uncontrolled variable battery voltage is applied to the motor when in the "on" intervals of the PWM pulses. If the battery voltage were not compensated by changing the pulse widths, the gain of the PWM permanent-magnet motor would vary with variations in battery voltage. In a gain-adjustable control system (for optimization of overshoot, shifting speed, etc.) an independently varying gain element, such as the motor, would degrade the operation when the motor's gain changes. Those variations would, if uncompensated, have to be corrected by the closed servo loop. That loop, however, can operate only at infrequent intervals, namely upon occurrences of shifts. The battery voltage could have changed in the meantime, and often does, with potential harmful effects on system performance. The present invention is a method for minimizing the effects of independent gain variations of the motor.

The battery voltage correction is an open-loop control that maintains the motor's gain at an approximately constant value by changing the pulse widths of the PWM signal as a function of battery voltage. The widths of the same pulses are also varying in accordance with the error signal of the closed loop of the servomechanism. Pulse width at the motor varies in accordance with both the battery voltage and the closed-loop error signal. The open-loop battery-voltage-correction circuitry compensates (by PWM changes) for changes in the battery voltage.

OBJECTS OF THE INVENTION

Accordingly, one object of the invention is to provide an actuator-control system including a closed-loop servomechanism having a motor that is powered by a variable power supply such as a battery, and in which variations of the battery's voltage are compensated by PWM, so that the power gain of the motor is independent of battery voltage, but is still dependent upon servomechanism error signals.

Another object is to provide an actuator-control system in which a servomechanism error signal controls a pulse-width-modulated signal that rapidly switches a motor on and off, and in which the pulse widths are controlled also by a signal that is responsive to the battery voltage.

Another object is to provide a control system in which a control signal for compensating for battery voltage variations is derived by squaring a ratio of a reference voltage to the instantaneous voltage of the battery.

Another object is to provide a control system in which a permanent-magnet (PM) motor is employed for driving a servomechanism, for example a device for shifting a transmission, and pulse-width-modulated signals are employed to switch the battery to the armature terminals of the PM motor, and the duty cycle of the pulse-width-modulated signals is controlled both by error signals from the servomechanism and by the voltage of the battery.

Another object is to provide a control system in which the effects on a motor of variations of battery voltage are compensated by varying the pulse widths of a PWM signal applied to the motor, and at least one parameter of the closed loop servomechanism is automatically adaptively altered in accordance with at least one performance characteristic of the shifting action.

Other objects are to provide methods for performing the functions of the apparatus described above.

Still more objects will be apparent from the description, drawings and claims of the invention.

BRIEF DESCRIPTION OF DRAWINGS

FIG. 12 is a table summarizing and comparing the shift performance of a transmission with and without battery-voltage compensation.

DESCRIPTION OF A PREFERRED EMBODIMENT

The present invention is related to another made by the same inventors and assigned to the same assignee, and described in U.S. patent application Ser. No. 07/802,921, entitled "Transmission Shifter Having Automatic Adjustment of Control Parameters", filed Dec. 6, 1991. Background information is available in U.S. Pat. No. 4,873,881, issued Oct. 17, 1989, entitled "Electrically Actuated X-Y Shifting Mechanism". Both the above application and the patent are made a part of the present application by reference.

A preferred embodiment of the invention can be utilized with, for example, a conventional synchronized mechanical gear-change transmission having an input shaft, a countershaft, and an output shaft. The transmission has six forward speeds ranging in ratio from 9:1 to 1:1 and a reverse speed having a ratio of 9:1. Shifting of the transmission is accomplished by a motorized mechanism shown schematically in FIGS. 1 and 2.

Figure 1:
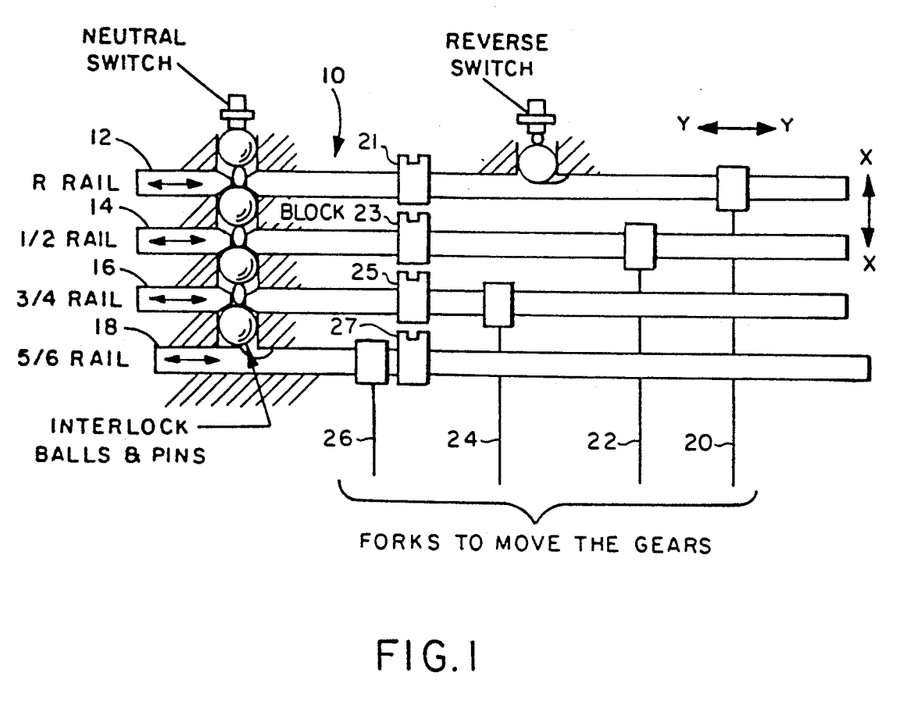
FIG. 1 is a schematic diagram of a portion of a synchronized mechanical transmission that can utilize the invention.

In FIG. 1, a rail assembly 10 is shown, which includes a reverse-gear rail 12, a 1st- and 2nd-gear rail 14, a 3rd/4th rail 16, and a 5th/6th rail 18. Each of the slidable rails 12, 14, 16, 18 has a shift fork 20, 22, 24, 26 respectively affixed to it, that can move forward and aft (Y axis) when its rail slides axially, and each shift fork has two operating positions.

In the forward position of a shift fork on the Y axis the selected gear is reverse, 1, 3 or 5, and in the aft position it is 2, 4 or 6.

A movable rail-selection shift finger 19 (X axis) selects one of either the reverse rail 12, the 1st/2nd rail 14, the 3rd/4th rail 16, or the 5th/6th rail 18, by engaging the selected rail's respective shift block 21, 23, 25, 27.

Figure 2:
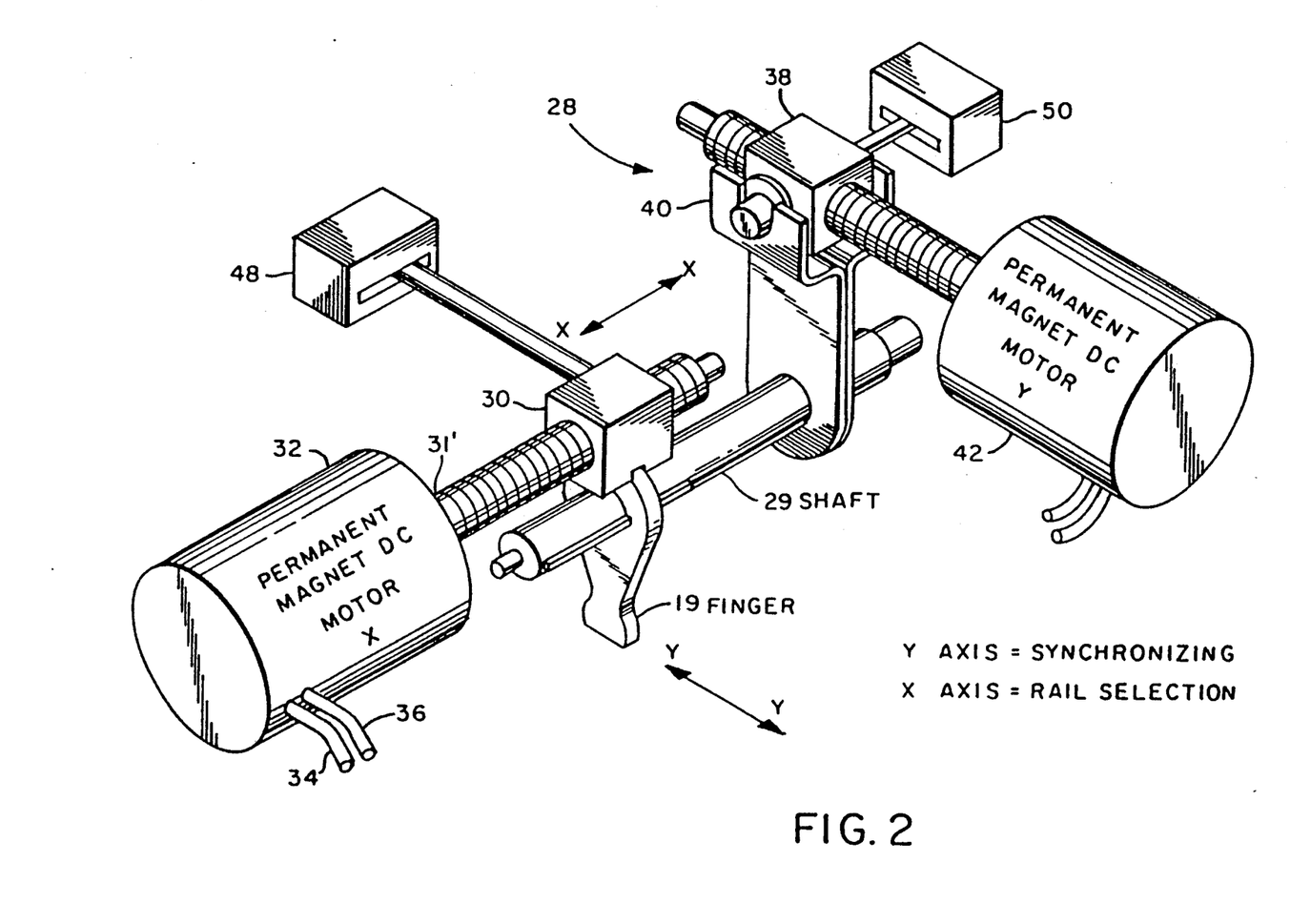
FIG. 2 is a mechanical schematic diagram of a shift mechanism and associated position sensors.

FIG. 2 shows the shift finger 19 mounted on a shift shaft 29, which are part of means 28 for sliding and rotating the shift finger 19 along the shaft 29.

a ball screw mechanism 30, which engages the shift finger 19, is driven by a bidirectional permanent-magnet DC motor 32 having electrical leads 34, 36. The ball screw mechanism 30 is capable of sliding the shift finger 19 (X axis) when the motor 32 rotates the screw of the ball screw mechanism.

Similarly, a ball screw mechanism 38 engages a clevis 40 that is affixed to the shaft 29 in such a way as to rotate the shaft 29 through a small angle, and therefore to rotate the shift finger 19 through that small angle (Y axis), when the ball screw mechanism 38 is operated. The mechanism 38 is driven by a permanent-magnet DC motor 42 that can be energized to rotate in either direction.

Each of the ball screw mechanisms 30, 38, is equipped with a position sensor 48, 50 respectively for providing a position feedback signal to an electronic control unit (ECU).

Position sensors 48, 50 are variable resistors having +12 volts applied to one terminal and ground potential applied to another terminal. An arm of the variable resistor 48 moves in accordance with the position of the ball screw mechanism 30, and therefore in accordance with the forward or aft position of the shift finger 19 on the shaft 29. The voltage on the arm of the variable resistor 48 provides an indication of the X-axis position of the shift finger 19. The Y-axis position sensor 50 is similar.

Arrangement of the Control Circuit

Figure 3:
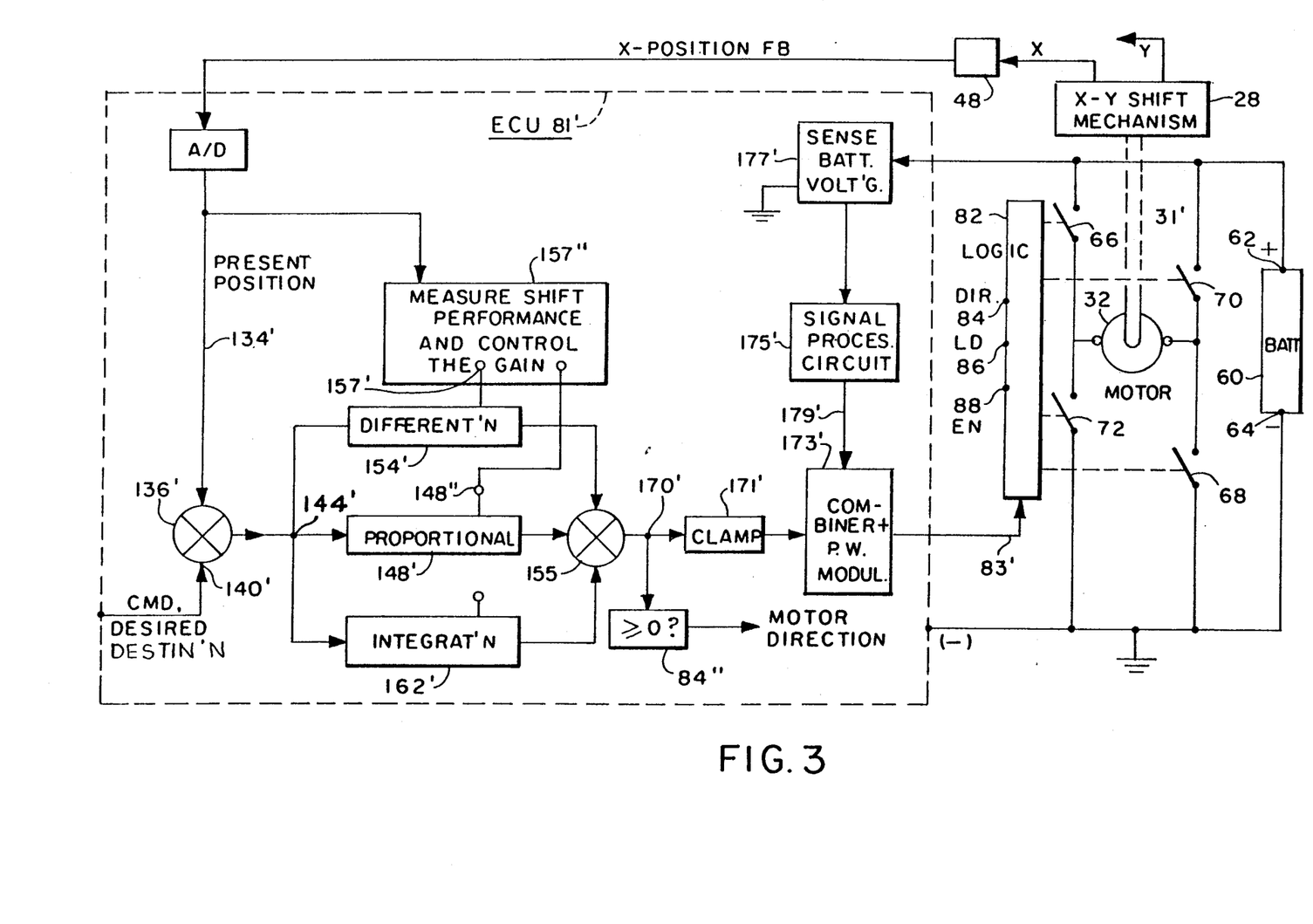
FIG. 3 is a simplified block diagram of one embodiment of a position-feedback servomechanism for shifting a transmission.

In the preferred embodiment being described, an electronic control unit (ECU 81') controls the shifting mechanism, as shown in simplified form in FIG. 3. The ECU includes a proportional-integral-differential control circuit, which is part of a microcomputer that performs many functions.

Figure 5:
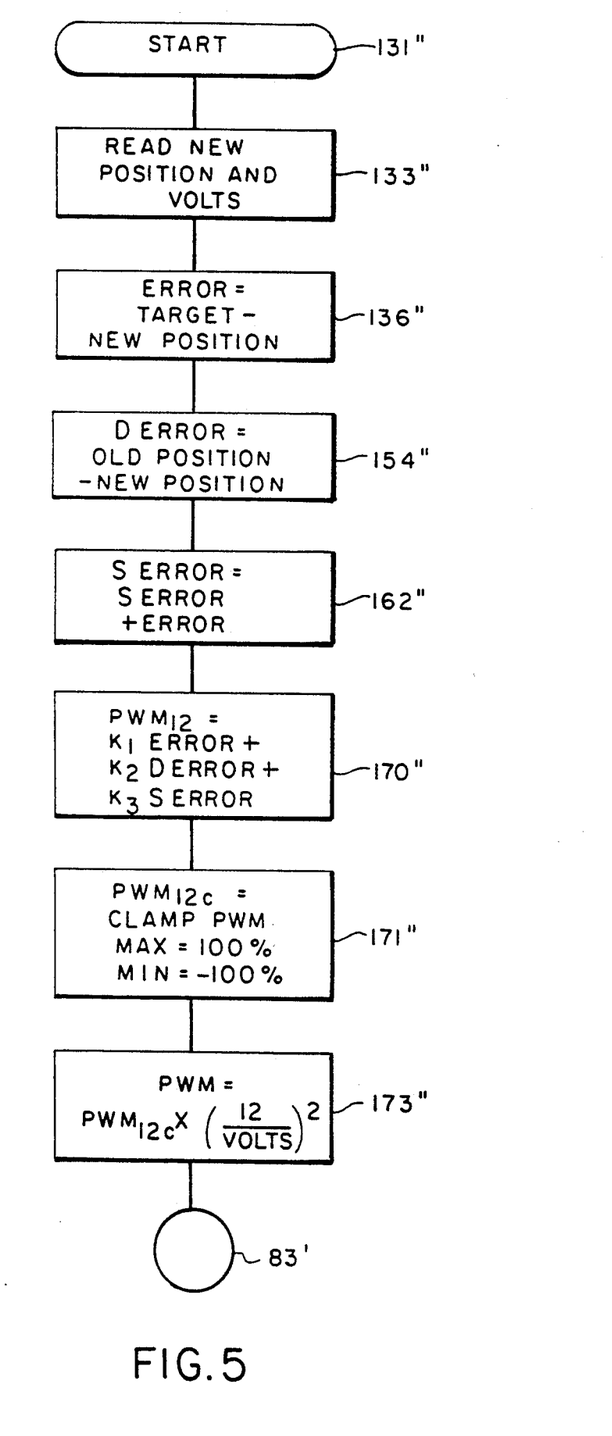
FIG. 5 is a flow chart of a voltage-compensation algorithm that is executed by a microcontroller that is part of the control system.

A microcomputer flow chart for performing an algorithm involved in this invention is shown in FIG. 5, to be described later. Only conventional well-known programming techniques are required to practice the invention. Nevertheless, for further clarity, a simplified analog version of some of the microcomputer's functions is shown; the left-hand portion of FIG. 3 is an analog representation of software in the ECU 81.

The connections of FIG. 3 are as follows. The X-axis position sensor 48 provides a signal at a terminal 134', which is input to a subtractor 136'. Another input to the subtractor 136', at a terminal 140', comes from a command register that stores the desired final position (destination) of a shift operation of the X-axis portion of the X-Y shift mechanism 28. The difference between the actual position signal at terminal 134' and the optimum destination at terminal 140' is an error signal at a terminal 144'.

That error signal passes through a variable-gain proportional amplifier 148', whose gain is controlled by a signal at a gain-control terminal 148". Amplifier 148' is one of three channels for processing the error signal and its output is one of three inputs to a summer 155.

The error signal at terminal 144' is also processed by a differentiating amplifier 154' that extracts the time-rate of change of the error. Its gain is also under the control of a gain-control terminal 157'. Its output goes to another input terminal of the summing device 155.

The error signal at terminal 144' is also input to an integrating amplifier 162', whose gain may be controlled if desired. Its output serves as a third input to the summer 155.

An output terminal 170' of the summer 155 is connected to a motor-direction-control circuit 84" and to a clamp 171', whose output is input to a combiner and pulse-width modulator 173'. Another input to the combiner and pulse-width modulator 173' comes from a battery-voltage-signal-processing circuit 175'. The input to that battery-signal-processing circuit comes from a battery-sensing circuit 177' to which a battery 60 is connected for battery-voltage measurement.

The output of the combiner and pulse-width modulator 173' is connected to a terminal 83' of a logic circuit 82, whose purpose is to control the switching of four electronic motor-control switches. The logic circuit 82 also has an input terminal 84 for controlling the direction of the motor 32, an L-Dump terminal 86, and an enable terminal 88, that are described more fully in the reference patent application, Ser. No. 07/802,921.

Outputs of the logic circuit 82 are connected to control the operation of electronic switches 66, 68, 70, and 72. The battery 60 has a positive terminal 62 that is connected to the switches 66 and 70 and to the battery-voltage-sensing circuit 177'. The battery's negative terminal 64 is connected to the switches 68 and 72 and to a negative ground terminal (−) of the ECU 81'. The switches 66 and 68 are connected so as, when closed, to enable application of battery voltage to the motor 32 with a certain polarity. The switches 70 and 72, on the other hand, are connected to enable application of battery voltage of the opposite polarity to the motor 32.

A mechanical output shaft 31' of the armature of the motor 32 is mechanically connected to drive an X-axis portion of the shift mechanism 28, whose position is sensed by the sensor 48 as described above. Similar arrangements are provided for the Y axis.

Operation of the Proportional-Integral-Differential Control Circuit

To illustrate the operation of the control loop of FIG. 3, assume that it is desired to shift from fifth gear to sixth gear. The sixth-gear position is entered into a destination-position register and is represented at terminal 140' of FIG. 3. Sensor 48 causes a signal at terminal 134' that indicates the instantaneous X-axis position of the shift finger 19. The destination signal at terminal 140' is subtracted in subtractor 136' from the digitized actual position signal at terminal 134' to produce an error signal at the terminal 144'.

The variable-gain proportional amplifier 148' provides a proportional component of error signal at one input of the summer 155.

A differentiated version of the error signal is produced by the differentiator 154' and that component of signal also enters the summer 155.

The error signal at terminal 144' is integrated in the integrator 162' and the result is also presented to the summer 155. The output 170' of the summer is clamped in clamp 171' and then enters combiner 173', where it is one factor in controlling the width of pulses at the input of the logic circuit 82.

The sign of the output from the summer 155, at terminal 170', is utilized to control the direction of rotation of the motor 32 by means of the direction-control circuit 84", which connects to the input terminal 84 of the logic circuit 82, FIG. 3.

Connections of Motor-Drive Circuit

Figure 4:
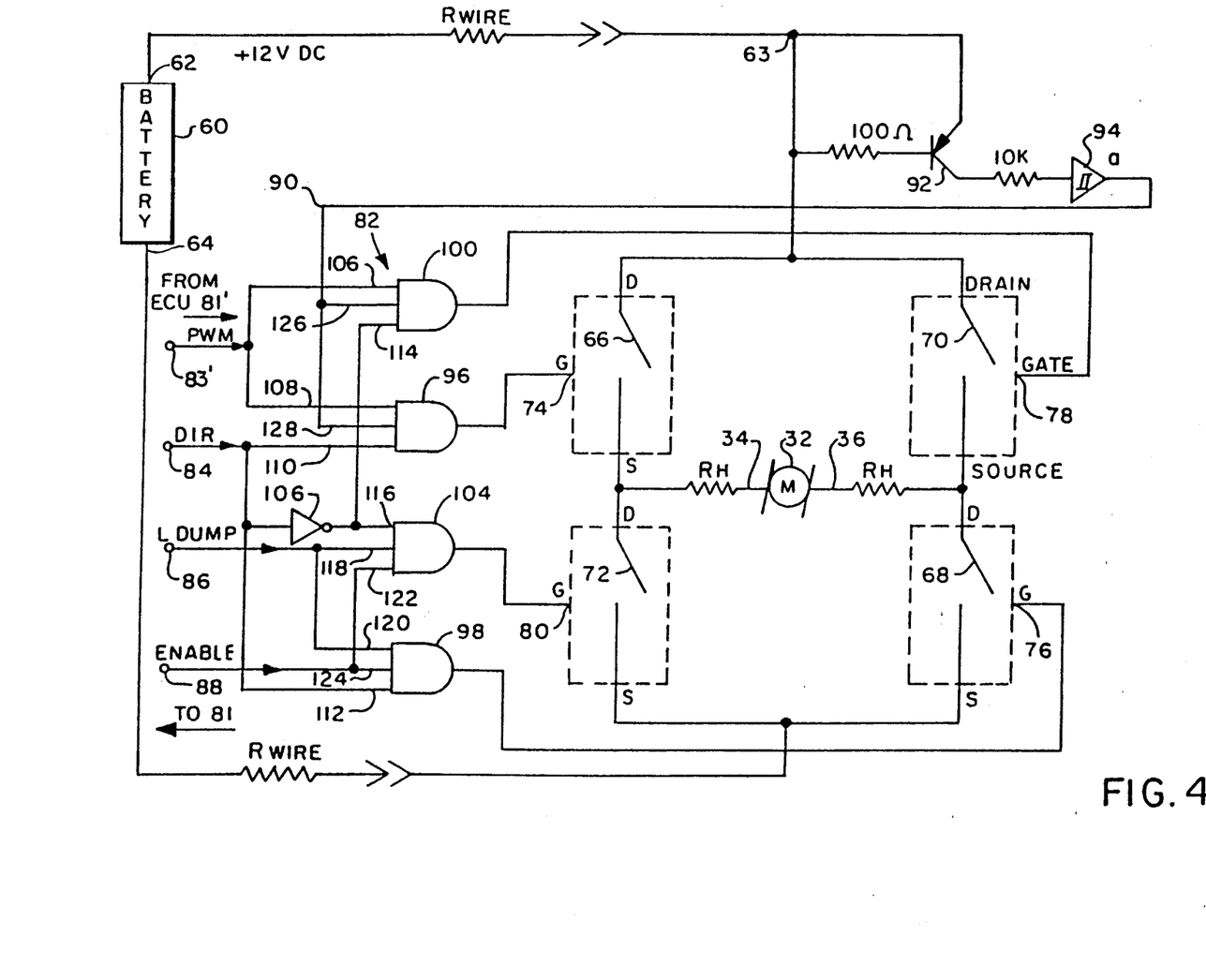
FIG. 4 is a simplified motor-drive schematic diagram for making (PWM) connections to a permanent-magnet DC motor that drives the shift mechanism.

In FIG. 4 the motor 32 is shown schematically in a conventional switching circuit that enables reversible operation. The battery 60 provides nominally 12-volt DC power between its positive terminal 62 and its ground terminal 64.

The electronic switches 66, 68, 70, 72 are field-effect transistors, each having a drain, a source and a gate terminal, in which the gate terminal controls the actuation of the switch and conventional load current flows from the drain to the source. The gate terminals are designated 74, 76, 78, 80 respectively.

The logic circuit generally designated 82 controls the operation of the switches 66, 68, 70, 72 in response to commands at its input terminals. These input terminals include the pulse-width-modulation (PWM) terminal 83', the directional terminal 84, the LDUMP terminal 86, and the ENABLE terminal 88.

Another input to the logic circuit 82, at a terminal 90, has a battery-voltage-presence signal. The battery voltage at a terminal 63 is processed by a series-connected transistor 92 and a logic amplifier 94, whose final output voltages are binary logic levels compatible with the logic circuit 82.

The logic circuit 82 comprises four AND gates 96, 98, 100, 104, whose outputs are connected to the gate terminals 74, 76, 78, 80 respectively. A logic 1 signal at an AND-gate's output closes the switch to whose gate terminal it is connected.

Each of the four AND gates has three inputs. The PWM terminal 83' is connected to input terminals 106, 108 of AND gates 100, 96 respectively. The directional terminal 84 is connected to input terminals 110 and 112 of the AND gates 96, 98 respectively and to the input terminal of an inverter 106. The output of inverter 106 is connected to input terminals 114 and 116 of the AND gates 100, 104 respectively.

The LDUMP terminal 86 is connected to input terminals 118, 120 of AND gates 104, 98 respectively. The ENABLE terminal 88 is connected to input terminals 122, 124 of AND gates 104, 98 respectively. The battery-sensing terminal 90 of the logic circuit 82 is connected to input terminals 126, 128 of the AND gates 100, 96 respectively.

In FIG. 4, when battery voltage is present at the terminal 63, a logic 1 is applied by amplifier 94 to the AND gates 100 and 96. Absence of battery voltage would block those AND gates and prevent operation of the shift motor 32 in either direction. This is an optional safety feature.

The ECU 81' is also capable of disabling the motor 32, by applying a logic 0 signal to either the ENABLE terminal 88 or the LDUMP terminal 86. That causes the AND gates 98, 104 to apply logic 0 signals to gate terminals of the switches 68, 72 respectively, so as to prevent the connection of a ground potential to either terminal of the motor 32.

Continuing with FIG. 4, the ECU 81' controls the direction of operation of the motor 32 by applying a logic 1 signal to the directional terminal 84 when it is desired to move the shift finger forward on the X-axis. That puts a logic 1 on inputs of the AND gates 96, 98 and a logic 0 (through the inverter 106) on the AND gates 100, 104. Only the forward switches 66 and 68 can then be closed. Conversely, a logic 0 at the directional terminal 84 disables switches 66, 68 and enables closure of the aft-direction switches 70, 72.

Operation of Motor-Drive Circuit, etc.

In an example of the operation of the circuit of FIG. 4 the AND gates 96 and 98 are enabled by the direction signal 84, and the AND gates 100 and 104 are disabled, so switches 70 and 72 cannot be closed. Assuming that battery voltage is present, as indicated by a logic 1 at terminal 90, and that the LDUMP and ENABLE signals at terminals 86 and 88 are logic is, the output of AND gate 98 is a logic 1, so that switch 68 is closed.

The output of AND gate 96 is now under the sole control of the logic signal at the PWM terminal 83'. The switch 66 receives a pulse-width-modulated signal at its gate terminal 74, having a duty cycle that depends upon the signal at terminal 83' of the pulse-width-modulator 173'. The switch 66 is therefore alternately opened and closed for a controllable duty cycle that has some average ON time, which controls the average positive voltage applied to terminal 34 of the motor 32. The motor 32 therefore receives electrical input power that varies in accordance with both the demand stated at the output 170' of the summer 155 and the signal at the output 179' of the battery-voltage signal-processing circuit 175'.

The motor 32 operates the ball screw mechanism 30 and moves the shift finger 19 with a controlled speed. As the shift finger 19 approaches the sixth gear position on the rail 18 it encounters the inside boundary of a target zone, whose location is stored in a register of the ECU 81'.

The transit time of shift finger 19 from the time of issuance of the shift command to the time of arrival at the inside boundary is measured by a timer in ECU 81'. Timer output information is sent to a circuit that selects appropriate gains for the variable-gain amplifiers 148' and 154'. Thus the gains of the variable-gain amplifiers are adjusted to achieve appropriate speed, overshoot, etc. of the positioning system, as described in the above-referenced patent application Ser. No. 07/802,921.

By changing the duty cycle of the PWM signal, the ECU 81' controls the average voltage applied to the motor 32. This compensates for variations of system parameters such as friction and also compensates for variations of the battery voltage.

In the manner just described, the ECU 81' controls the operation of the motor 32 and movements of the shift finger 19 in forward and aft directions on the X-axis.

Similar circuits control the Y-axis motor 42.

Flow Chart for Voltage-Compensation Algorithm

FIG. 5 is a flow chart depicting an algorithm for compensating for variations in battery voltage, as to the battery voltage's effect on the power gain of the motor 32. FIG. 3 will also be referred to in describing the flowchart.

The program starts at symbol 131". In flow chart block 133", the position of the X-shift mechanism is measured by the position-sensing transducer 48 and a new position signal is entered into the ECU 81' at the terminal 134'. The block 133" also receives a measure of the voltage of the battery 60, which is sensed by sensor 177', as shown in FIG. 3.

The new position of the shift mechanism 30 is compared with the desired destination (whose value is standing at terminal 140'), in a subtractor block 136" of the flow chart to produce the error signal at the terminal 144'.

The time-rate of change of the error signal at 144' is determined in a block 154" by comparing the newly-measured error with the previous error. In a block 162" the error is integrated by adding the newly measured error to the previously accumulated errors.

In a block 170" the appropriate pulse-width modulation (corresponding to the gain of the motor 32 when the battery voltage is 12 volts), is computed. It is the sum of a first gain constant K1 times the proportional error plus a second gain constant K2 times the time-rate of change of error plus a third gain constant K3 times the integral of errors. The result is a signal at the terminal 170' of FIG. 3.

In a block 171" the desired pulse-width-modulation signal for 12 volts is clamped to a maximum of 100% and a minimum of −100% of the signal to enable it to be handled within the operable range of the circuits.

The resulting clamped signal is multiplied in a block 173" by the square of the ratio of 12 volts (reference) to the instantaneous battery voltage. The resulting signal at terminal 83' corresponds to the pulse-width-modulated input at terminal 83' of the logic circuit 82 (FIG. 3).

Performance Data

FIGS. 6–11 are data tables whose entries are the times required to perform various shifts of the transmission. The same prototype shifting device was used for all of the data of FIGS. 6–12. The times are expressed in computer loops, wherein a loop is ten milliseconds. The number in parentheses following each table entry represents a matrix pointer address that determines the proportional- and differential-channel gains for the adaptive controller of the shifter, which relates to the parameter-adjustment feature of the apparatus.

The parameter-adjustment capability and the voltage-compensation capability co-exist in the apparatus without interfering with each other. The voltage-compensation system makes the job of the parameter-adjustment system easier; it substantially eliminates one independent variable, namely the battery voltage, which in the absence of battery-voltage compensation would impair the parameter-adjustment system's performance.

Without the voltage-compensation system, the gain of the motor 32 would vary as the battery voltage changed. That would be very disruptive of the parameter-adjustment system, especially in the preferred embodiment of the parameter-adjustment system in which the parameters that are adjusted are gain parameters, namely, the gains of the proportional and differential channels of the controller. When the voltage-compensation capability is provided, the gain of the motor 32 is made constant, so the gain of the closed-loop control system is under the sole control of the parameter-adjustment system, enabling the shifter to perform significantly better.

The first column of each of the tables of FIGS. 6–11 represents times to shift from 1st/2nd rail to the reverse rail. Note that first and second gear share the 1st/2nd rail. The second column shows the times to shift from the reverse rail back to the 1st/2nd rail. The third column is for upshifts from the 1st/2nd rail to the 3rd/4th rail. The fourth column is for shifts from the 3rd/4th rail to the 5th/6th rail. The fifth column is for shifts from the 5th/6th rail down to the 3rd/4th rail. The sixth column is the times for shifts from the 3rd/4th rail down to the 1st/2nd rail.

Figure 6:
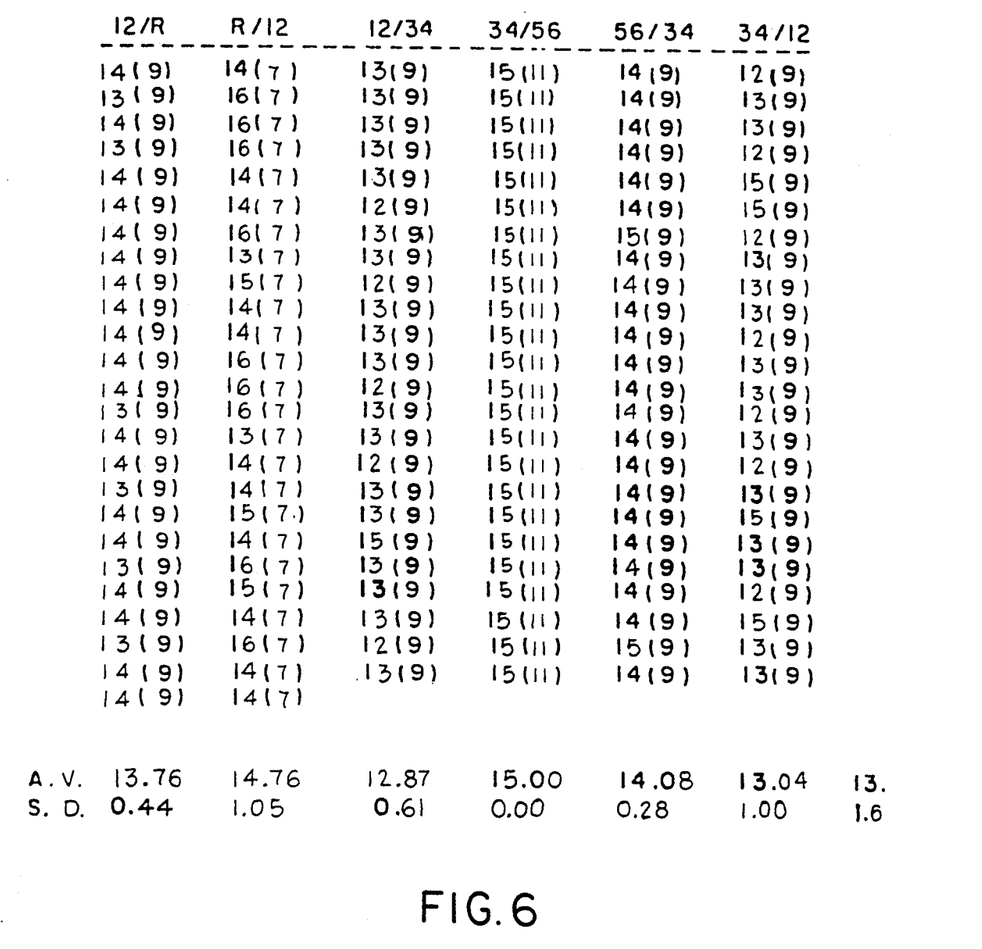
FIG. 6 is a table showing shifting times for various shifting tasks performed by the servomechanism when the voltage compensation circuit is disconnected and when the battery voltage is 10 volts. For example, it shows the time to shift from first or second gear into reverse.
Figure 7:
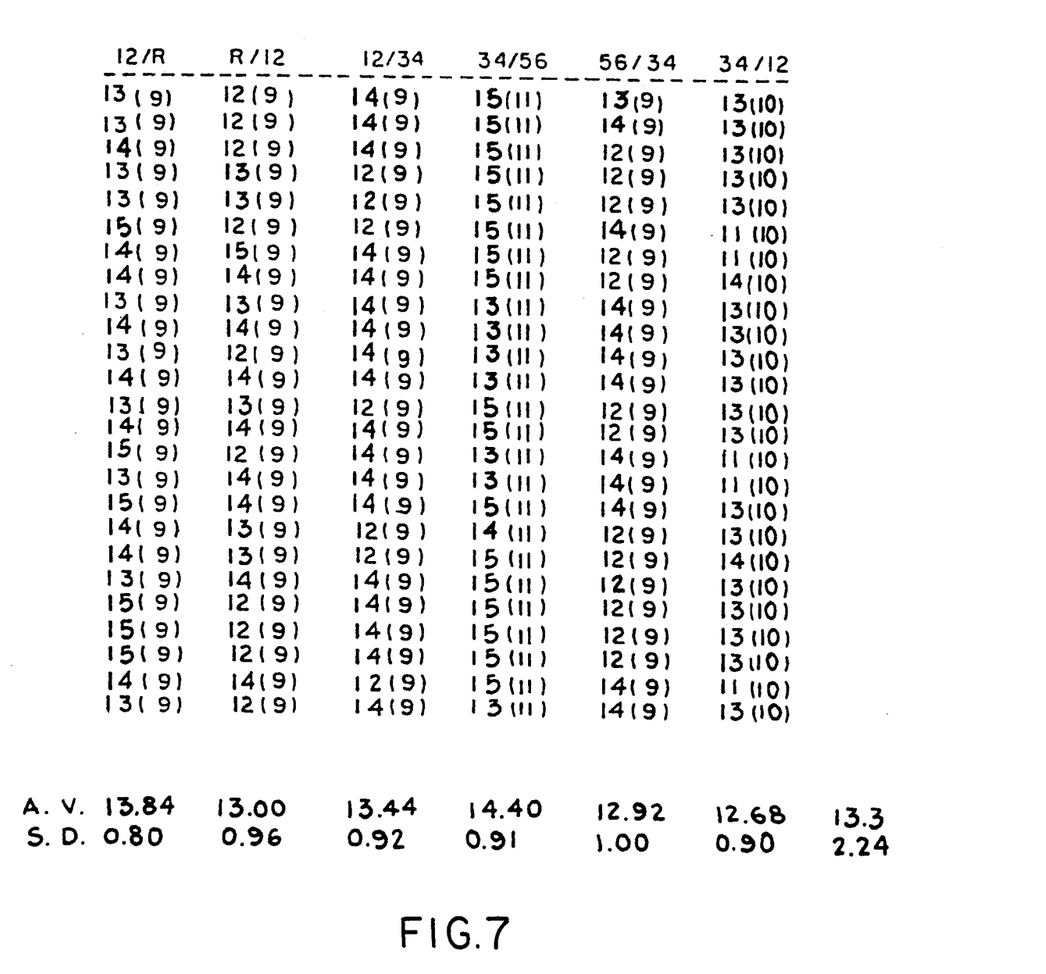
FIG. 7 is the performance of the system of FIG. 6 except with the benefit of having the voltage-compensation circuit connected, again at 10 volts of battery voltage.

Near the bottom of each of FIGS. 6–11 are two rows of numbers labelled "A.V." and "S.D.". Row A.V. shows the average shift times for each of the six columns, and at the extreme right the average of all of those averages is shown. In row S.D. the standard deviation is shown for the data in each of the six columns. The battery voltage was 10 volts when the data were taken for FIGS. 6 and 7. FIG. 6 was without battery-voltage compensation and FIG. 7 was with battery-voltage compensation.

Figure 8:
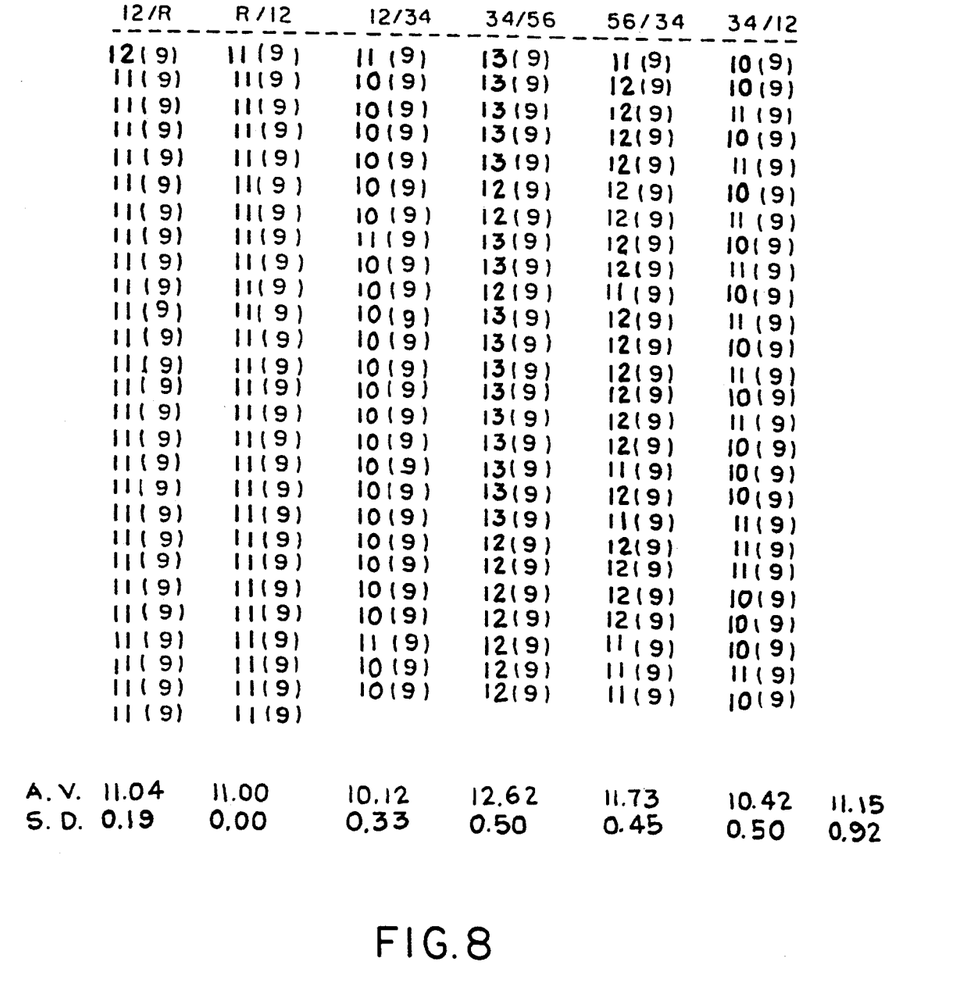
FIG. 8 is similar to FIG. 6 except that the battery voltage is 12 volts.
Figure 9:
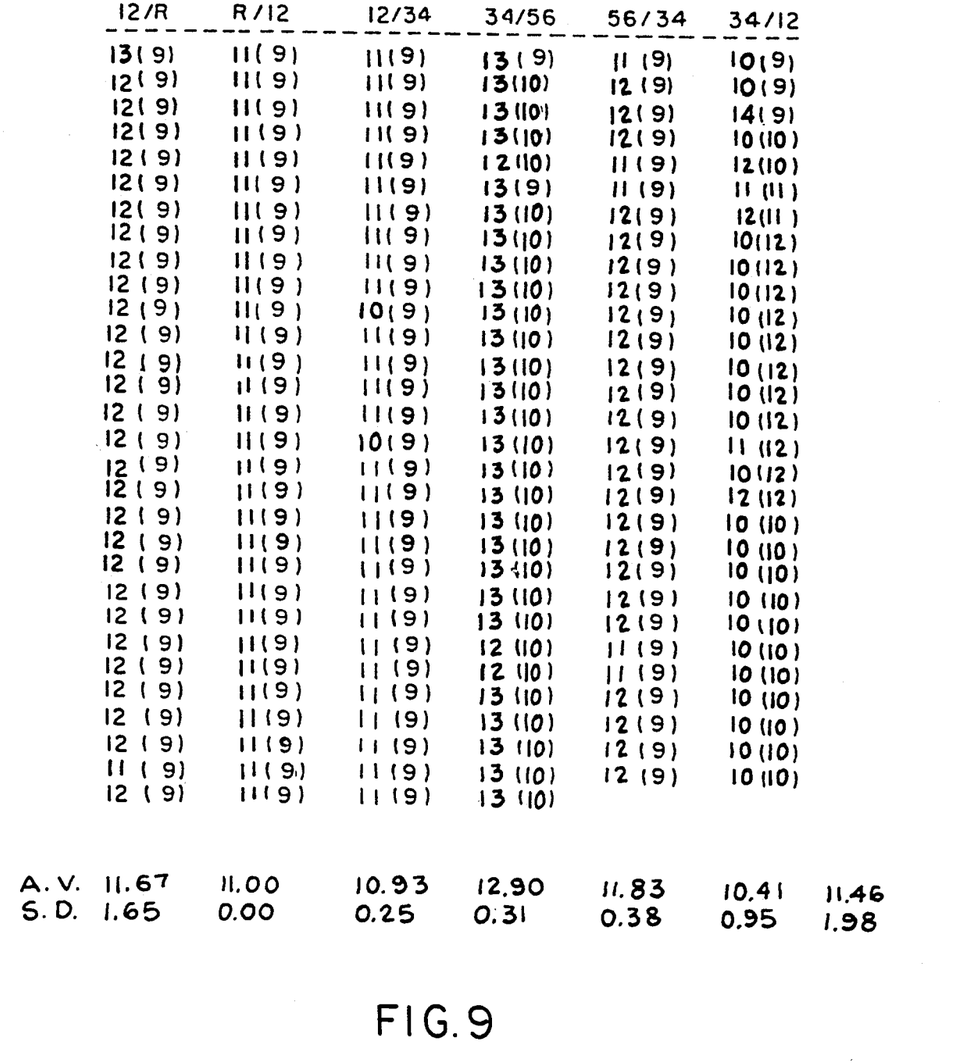
FIG. 9 is similar to FIG. 7 except that the battery voltage is 12 volts.
Figure 10:
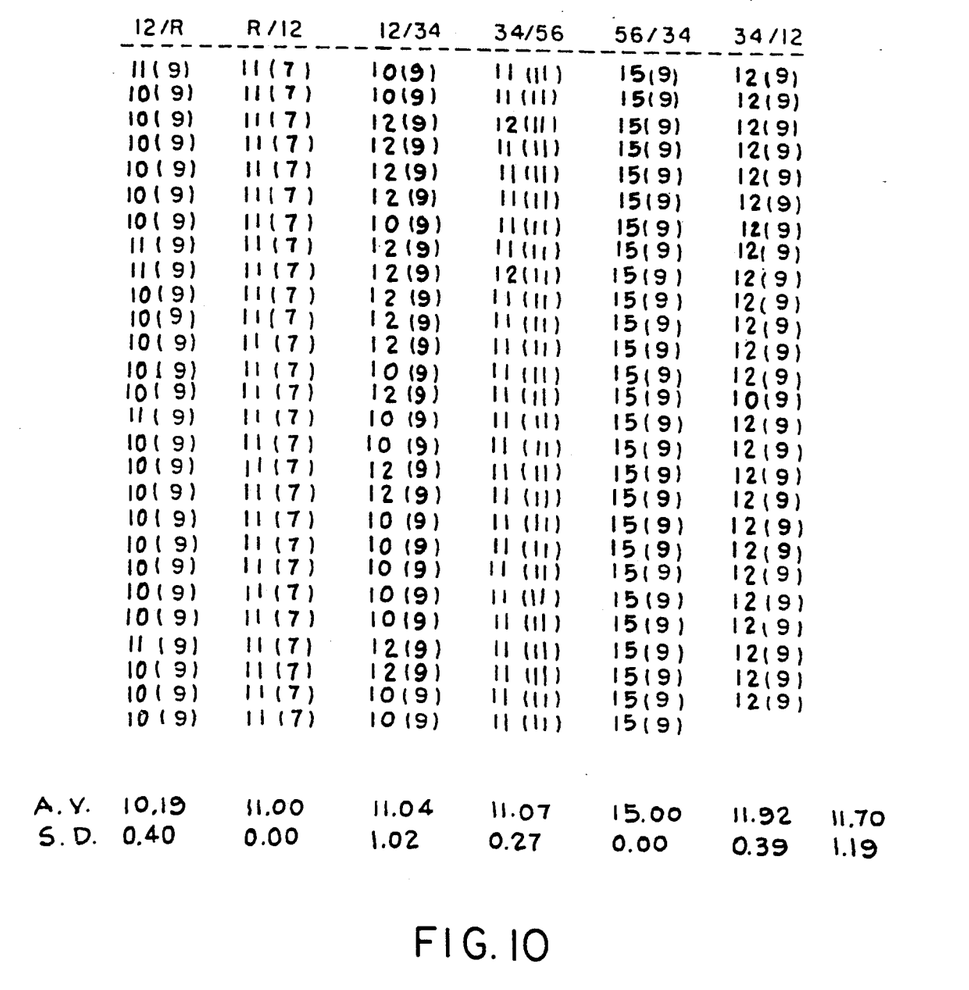
FIG. 10 is similar to FIG. 6 except that the battery voltage is 16 volts.
Figure 11:
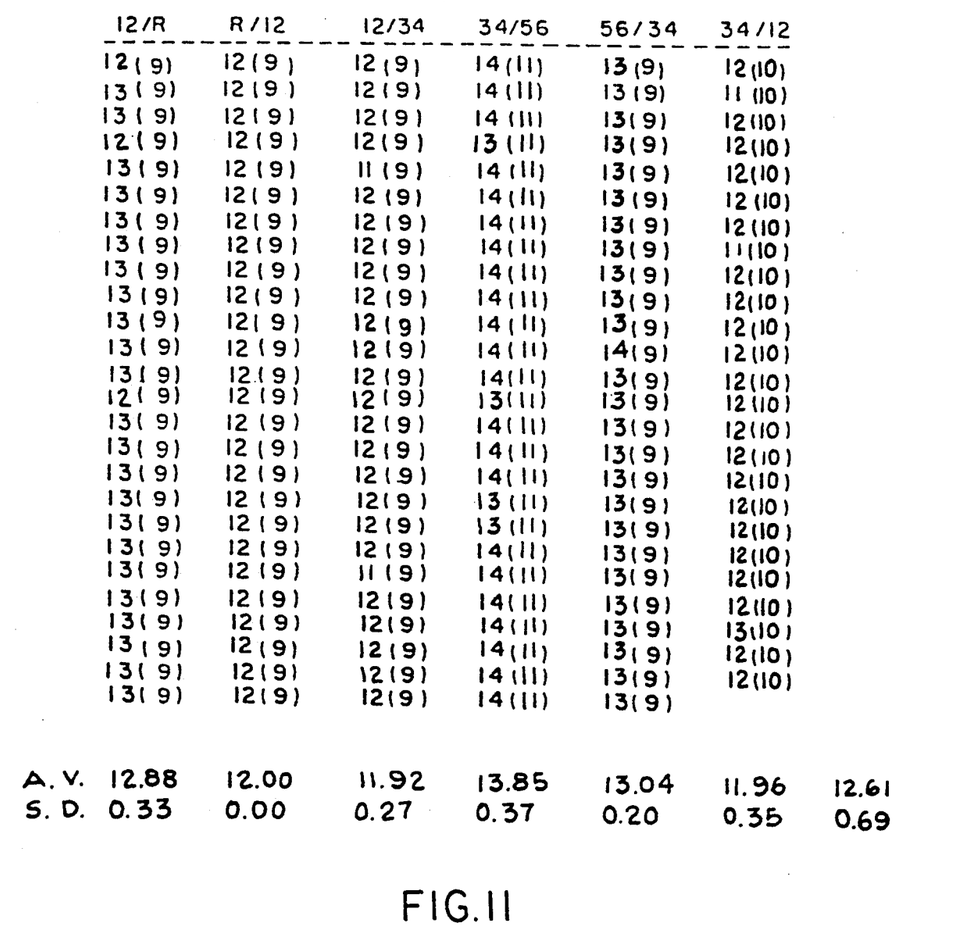
FIG. 11 is similar to FIG. 7 except that the battery voltage is 16 volts.

FIGS. 8 and 9 are for battery voltage of 12 volts; FIG. 8 is without voltage compensation and FIG. 9 is with voltage compensation. The variation between FIGS. 8 and 9 is considered normal, and likely due to imperfect parameter compensation for unmeasured variables such as motor temperature. FIGS. 10 and 11 are for a battery voltage of 16 volts; FIG. 10 was without voltage compensation and FIG. 11 was with voltage compensation. In FIG. 12 the results of tests for the effectiveness of voltage compensation are summarized and analyzed. The performance of a "population one" that doesn't have voltage compensation is compared with the performance of a "population two" that has voltage compensation. Every entry in the two population tables represents about 25 shifts.

The first column of each of the two population tables of FIG. 12 is the voltage of the battery. The second column is the average shift time for shifting from the reverse rail to the 1st/2nd rail. The third column is the average shift time for shifting from the 1st/2nd rail to the 3rd/4th rail. The fourth column is for shifting from the 5th/6th rail to the 3rd/4th rail and the fifth column is for shifting from the 3rd/4th rail to the 1st/2nd rail. The sixth column is the average shifting time for columns 2–5 for each corresponding battery voltage. The seventh column is the standard deviation of the shift time data of columns 2–5 for the corresponding battery voltage.

At the bottom of the "population one" table of FIG. 12 is a row showing the average shift time for each of columns 2–5, and at the right of that row is the average of those four averages, 11.95. Another row, labelled Sxsf,i, gives the standard deviation of the data of column 2 and of each of the other columns, and at the extreme right is the standard deviation for all of the data of the "population one" table.

Also given are the standard deviation if the battery voltage and the type of shift performed are independent, and the maximum shift time if the population is of a normal distribution (3 sigma). Similar data are presented in respect of the table for "population two" of FIG. 12.

These figures show that the average shift time with voltage compensation ("population two") is 12.15 computer loops and the average shift time without voltage compensation is 11.95 shift loops. The shift time is negligibly greater (1.6% greater) with voltage compensation, as would be expected, because the particular data taken in these tests has the battery voltage ranging from only 2 volts below the reference of 12 volts, to 4 volts above the reference of 12 volts. The 16-volt battery voltage results in a very high gain for the motor 32 which is undesirable in that it cannot be reliably reproduced under lower-battery-voltage conditions.

It is much more significant that the standard deviation of the shift times with compensation is only 0.11 while the standard deviation without voltage compensation is almost twice as great, at 0.21. Moreover, with voltage compensation the maximum shift time if the population is normal is only 13.8, which is significantly less than the 15.0 maximum shift time for the population without voltage compensation.

Thus, the performance of the shift servomechanism is shown to be significantly improved by the voltage compensation, and it is shown that the voltage compensation system is capable of compatible operation with the adaptive servomechanism, even though both systems operate by adjusting the pulse widths of the same PWM signals that are applied to the switches for controlling the motor 32.

OTHER EMBODIMENTS

An embodiment employing an adaptive control system for adjusting parameters, along with the voltage compensation of the subject invention, has been described. Clearly it is not necessary that the control system have adaptive parameter-adjustment capability in order to employ the voltage compensation invention that is described.

Although the invention has been illustrated by only a few embodiments, many other forms are possible using its principles. The scope of the invention is defined by the claims.

What is claimed is:

1. A method for actuating a mechanical load by means of a vehicular actuator having a mechanism (30, 19) that is moved by a motor (32) in accordance with a shift command (140), and also having control equipment (136', etc) for receiving said shift command and for receiving a feedback signal from a sensor (48) that senses the position of said mechanism for providing and processing an error signal (at 171'), and a power source (60) of varying voltage that is connectable to the motor (32) by pulse-width-modulated switches (82, 66, etc), comprising steps of:

sensing said varying power-source voltage and processing the result to provide a voltage-compensation signal (at 179');

controlling (173') the duty cycle of the pulse-width modulation of said switches in response to (a) said processed error signal (171') from said control equipment, and (b) said voltage-compensation signal (179');

whereby said duty cycle (83') varies in accordance with both said processed error signal (171') and said voltage-compensation signal (179'), and the performance of said motor (32) is dependent upon said processed error signal (171') and is substantially independent of voltage variations of said power source (60);

and wherein said step of controlling said duty cycle in response to said voltage-compensation signal (179') comprises controlling said duty cycle so as to make the power gain of said motor (32) independent of said voltage variations of said power source (60);

and wherein said step of sensing said varying power-source voltage and processing the result comprises determining (175') the ratio of a reference voltage to said varying power source voltage, and said step of controlling said duty cycle in response to said voltage-compensation signal comprises multiplying (173') said processed error signal (179') by the square of said ratio.

2. A method for shifting a change-gear transmission by means of a shift actuator system having a shift mechanism (30, 19) that is moved by a motor (32) in accordance with a shift command (140'), and also having control equipment (136', etc) for receiving said shift command and for receiving a feedback signal from a sensor (48) that senses the position of said shift mechanism for providing and processing an error signal (at 171'), and a power source (60) of varying voltage that is connectable to the motor (32) by pulse-width-modulated switches (82, 66, etc), comprising steps of:

sensing said varying power-source voltage and processing the result to provide a voltage-compensation signal (at 179');

controlling (173') the duty cycle of the pulse-width modulation of said switches in response to (a) said processed error signal (171') from said control equipment, and (b) said voltage-compensation signal (179');

whereby said duty cycle (83') varies in accordance with both said processed error signal (171') and said voltage-compensation signal (179'), and the performance of said motor (32) is substantially independent of voltage variations of said power source (60);

wherein said step of controlling said duty cycle in response to said voltage-compensation signal (179') comprises controlling said duty cycle so as to make the power gain of said motor (32) independent of said voltage variations of said power source (60); and     wherein said step of sensing said varying power-source voltage and processing the result comprises determining (175') the ratio of a reference voltage to said varying power-source voltage, and said step of controlling said duty cycle in response to said voltage-compensation signal comprises multiplying (173') said processed error signal (179') by the square of said ratio.

3. A transmission control system for shifting a change-gear transmission by means of a servomechanism that includes a shift mechanism (30, 19) that is moved in accordance with a shift command (140'), said servomechanism also including control equipment (136', etc) for receiving said shift command and for receiving a feedback signal from a shift-mechanism-position sensor (48) and for providing an error signal (at 171'), and a power source (60) of varying voltage that is connectable to a motor (32) by pulse-width-modulated switches (82, 66, etc) comprising:

means for processing said error signal to provide a processed error signal (at 171');

means (177') for sensing the voltage of said power source and providing a voltage-responsive signal accordingly;

means (175') for processing said voltage-responsive signal to produce a voltage-compensation signal (at 179');

means (173') for combining said processed error signal (171') and said voltage-compensation signal (179') and for providing a pulse-width-modulated signal (at 83');

motor means (32) for driving said shift mechanism (30);

switching means (82, 66, etc) receiving said pulse-width-modulated signal (83') and for controlling the application of power from said power source (60) to said motor means (32) in accordance with said pulse-width-modulated signal;

whereby the performance of said motor (32) in driving said shift mechanism (30) is dependent upon said processed error signal (171') and is substantially independent of said voltage variations of said power source (60);

wherein said means (175') for processing said voltage-responsive signal to produce a voltage compensation signal (179') comprises means for processing said voltage-responsive signal so as to make the power gain of motor (32) independent of said voltage variations of said power source (60);

wherein said means (175') for processing said voltage-responsive signal comprises means for determining the ratio of a reference voltage to said varying power-source voltage; and,     said means (173') for combining said processed error signal (171') and said voltage-compensation signal (179') and for providing a pulse-width-modulated signal (83') comprises means for multiplying (173') said processed error signal (171') by the square of said ratio.

* * * * *